United States Patent
Wu et al.

(10) Patent No.: US 7,228,408 B2
(45) Date of Patent: Jun. 5, 2007

(54) COMPUTER SYSTEM CAPABLE OF OPERATING IN MULTIPLE OPERATION MODES AND THE OPERATING METHOD THEREOF

(75) Inventors: Chien-Hao Wu, Taipei Hsien (TW);
Kuo-Hua Chang, Taipei Hsien (TW);
Ming-Chih Ko, Taipei Hsien (TW);
Shih-Chieh Kuo, Taipei Hsien (TW)

(73) Assignee: Acer Inc., Taipei Hsien (TW)

( * ) Notice: Subject to any disclaimer, the term of this patent is extended or adjusted under 35 U.S.C. 154(b) by 591 days.

(21) Appl. No.: 10/796,476

(22) Filed: Mar. 9, 2004

(65) Prior Publication Data
US 2004/0205396 A1 Oct. 14, 2004

(30) Foreign Application Priority Data
Mar. 11, 2003 (TW) .............................. 92105170 A

(51) Int. Cl.
*G06F 9/24* (2006.01)
*G06F 1/24* (2006.01)
*G06F 13/00* (2006.01)

(52) U.S. Cl. .......................... 713/1; 713/100; 711/170
(58) Field of Classification Search ................... 713/1, 713/100; 711/162, 170; 700/17; 715/739
See application file for complete search history.

(56) References Cited
U.S. PATENT DOCUMENTS 6,367,074 B1 * 4/2002 Bates et al. ................. 711/170
6,430,663 B1 * 8/2002 Ding .......................... 711/162
6,819,961 B2 * 11/2004 Jacobs et al. ................. 700/17
6,993,722 B1 * 1/2006 Greer et al. ................. 715/739
7,010,634 B2 * 3/2006 Silvester ..................... 710/303

FOREIGN PATENT DOCUMENTS

EP         1154350 A2 * 11/2001
JP       2002007139 A  *  1/2002

* cited by examiner

*Primary Examiner*—Thomas Lee
*Assistant Examiner*—Suresh K Suryawanshi
(74) *Attorney, Agent, or Firm*—Quintero Law Office

(57) ABSTRACT

A multi-mode operation system and method for computer systems is proposed. The system includes a storage device having first and second disk partitions, a mode controller and a master boot program. The master boot program checks the status of the mode controller. If the computer system is running in PC mode, the master boot program hides the second disk partition, boots from the first disk partition, and loads a complete version of an operating system therein, thereby enables the computer system to run in the PC mode. If the computer system is running in a sub-mode being defined as an entry of a multimedia mode class, such as a music playing mode or video playing mode, the master boot program activates the second disk partition, boots therefrom, and loads a refined version of the operating system therein, thereby enables the computer system to run in the selected sub-mode.

24 Claims, 7 Drawing Sheets

1

COMPUTER SYSTEM CAPABLE OF OPERATING IN MULTIPLE OPERATION MODES AND THE OPERATING METHOD THEREOF

BACKGROUND OF THE INVENTION

1. Field of the Invention

The present invention relates to a system and method of operating a computer, and particularly to a computer system that is enabled to operate in multiple modes according to the manipulation of a mode controller.

2. Description of the Related Art

In addition to the conventional functions that a computer can provide, most current computer systems have integrated a great amount of additional function for the purpose of entertainment, such as CD/MP3 player, VCD/DVD player, TV broadcaster and photo viewer apparatus.

Current computer systems can satisfy the demands of users. The operating system of a computer can execute numerous multimedia software, such as music player, video player, TV broadcaster, radio (AM/FM) receiver, photo capturer and image explorer, video/audio recording programs, and perform associated multimedia functions using related peripheral appliances and corresponding drivers. However, there is no simple and effective mechanism by which users can operate the multimedia software conveniently. In a conventional operating environment of a computer, the operating system of the computer system must be activated first, so that users can manually select and launch specific software to perform desired functions. The operating system is a complex software product capable of allowing the computer system to accomplish the functions required by the user, and the normal boot procedure of the computer system takes a long time to load applications and drivers and enable initial settings. Thus it is inefficient for users to perform desired multimedia functions in the conventional operating environment.

In practice, the computer system functions solely as an electronic multimedia device. That is, only related applications and peripheral hardware corresponding to the specified multimedia functions are used, while other software and hardware elements of the computer system are not required. Therefore, the time spent in booting the computer system and performing related operations is a key issue for users who desires to efficiently use the computer system.

SUMMARY OF THE INVENTION

It is therefore an object of the present invention to provide a computer system capable of operating in multiple operation modes according to the manipulation of a mode controller being connected to the computer, either by a cable or wireless means.

To achieve the above object, the present invention provides a computer system capable of operating in multiple operation modes. The computer system according to the embodiment of the present invention includes a storage device having a first disk partition and a second disk partition, a mode controller having a status indicating an operation mode of the computer system, and a master boot program to check the status of the mode controller. If the computer system is configured to operate in a normal PC mode, the master boot program hides the second disk partition, boots from the first disk partition and loads a complete version of an operating system stored therein, thereby enables the computer system to run in the PC mode.

2

If the computer system is configured to operate in a sub-mode being defined as an entry of a multimedia operation mode class, the master boot program activates the second disk partition, boots the computer system therefrom and loads a refined version of an operating system stored therein, thereby enables the computer system to run in the selected sub-mode under the control of the refined version of the operation system.

If the computer is operating in the selected sub-mode, the master boot program further sets the memory size of the data area in the BIOS (Basic Input/Output System) to a predetermined value, and purifies the operating environment of the operating system, for example, by disabling the keyboard and mouse devices and Plug-and-Play capability.

Further, a monitor program is executed when the computer system is operating in the selected sub-mode. The monitor program is active on the background of the refined version of the operating system, and is used to detect the status of the mode controller. A first sub-mode application specific to the selected sub-mode is running under the control of the refined version of the operating system. If the operation mode of the computer system changes to another sub-mode, the monitor program stops the first sub-mode application and executes a second sub-mode application specific to the currently selected sub-mode. If the operation mode of the computer system changes back to the PC mode, the monitor program stops the first sub-mode application, enables the computer to enter a hibernation state, and reboots the computer system. If the computer system is turned off, the monitor program stops the first sub-mode application and enables the computer to enter the hibernation state.

Further, a resident program is executed when the computer system is running in the PC mode. The resident program detects the status of the mode controller indicating the operation mode of the computer system, displays a confirmation window if the operation mode of the computer system is about to change to a sub-mode, and reboots the computer system if a confirmation signal is received via the confirmation window.

An operating method of a computer system according to the embodiment of the present invention is also provided. First, a storage device having a first disk partition and a second disk partition is provided in the computer system. Then, a mode controller having a status indicating an operation mode of the computer system is also provided. At first, a master boot program checks the status of the mode controller. If the status of the mode controller indicates a normal PC mode, the master boot program hides the second disk partition, boots the computer system from the first disk partition, and loads a complete version of an operating system stored therein, thereby enables the computer system to run in the PC mode. If the status of the mode controller indicates a sub-mode being defined as an entry of a multimedia operation mode class, the master boot program activates the second disk partition, boots the computer system therefrom, and loads a refined version of the operating system stored therein, thereby enables the computer system to run in the sub-mode.

Similarly, if the computer system in running in the selected sub-mode, the master boot program further sets the memory size of the data area in the BIOS to a predetermined value, and purifies the operating environment of the operating system, for example, by disabling keyboard and mouse devices and Plug-and-Play capability.

Further, a monitor program is executed when the computer system is running in the selected sub-mode. The monitor program executes a first sub-mode application specific to the selected sub-mode and detects the status of the mode controller. If the status changes to another sub-mode, the monitor program stops the first application and executes a second sub-mode application specific to the currently selected sub-mode. If the operation mode of the computer system changes back to the PC mode, the monitor program stops the first sub-mode application, enables the computer to enter a hibernation state, and reboots the computer system. If the computer system is turned off, the monitor program stops the first sub-mode application and enables the computer to enter the hibernation state.

Further, a resident program is executed when the computer system is running in the PC mode. The resident program detects the status of the mode controller, displays a confirmation window if the operation mode of the computer system changes to a sub-mode, and reboots the computer system if a confirmation signal is received via the confirmation window.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
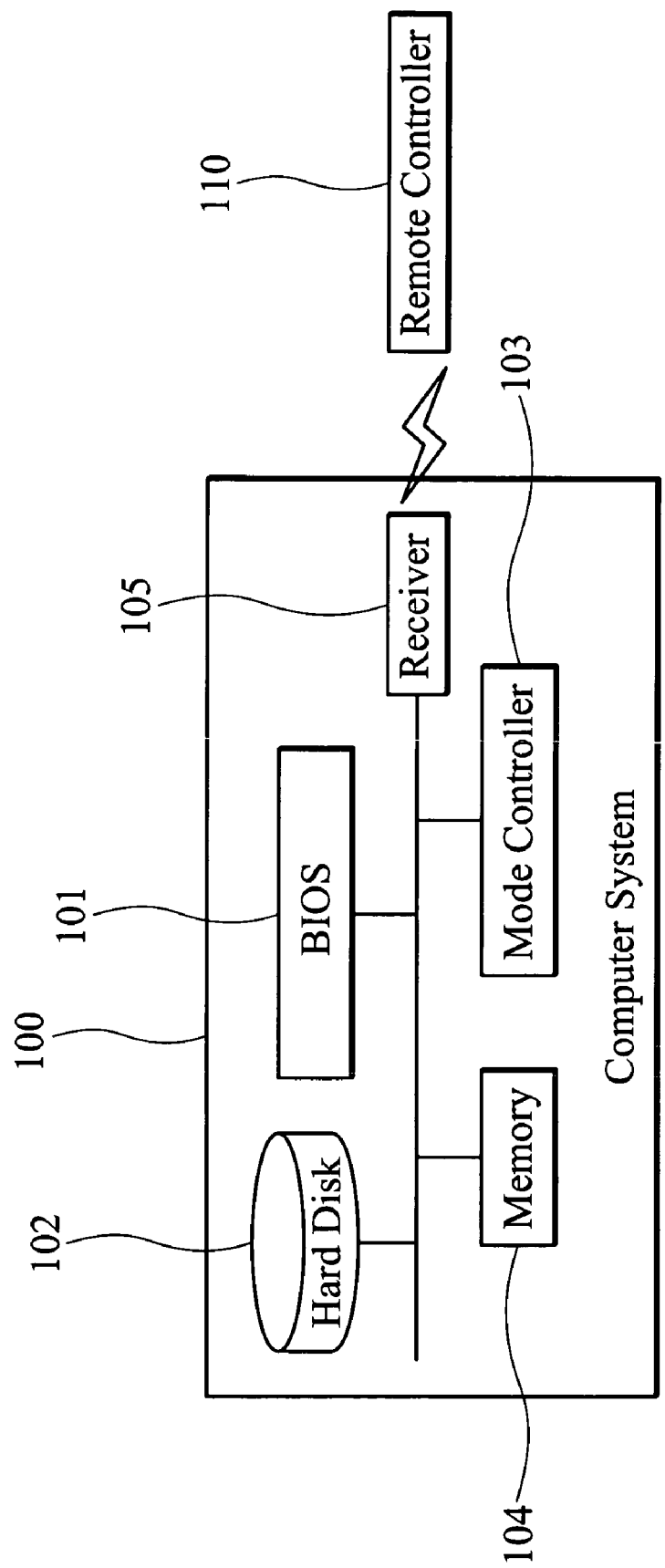
FIG. 1 is a schematic diagram illustrating the architecture of the computer systems capable of operating in multiple operation modes according to an embodiment of the present invention.

FIG. 1 illustrates the architecture of the computer system capable of operating in multiple operation modes according to the embodiment of the present invention. The computer system 100 includes a BIOS 101, a hard disk 102, a mode controller 103, a memory 104 and a receiver 105 that is used to receive signals from a remote controller 110.

The BIOS 101 is a firmware stored in a ROM (Read Only Memory) on the motherboard of the computer system 100, and provides several functions, such as basic input and output, setting configuration, hardware testing of the computer system, and so forth.

Figure 2:
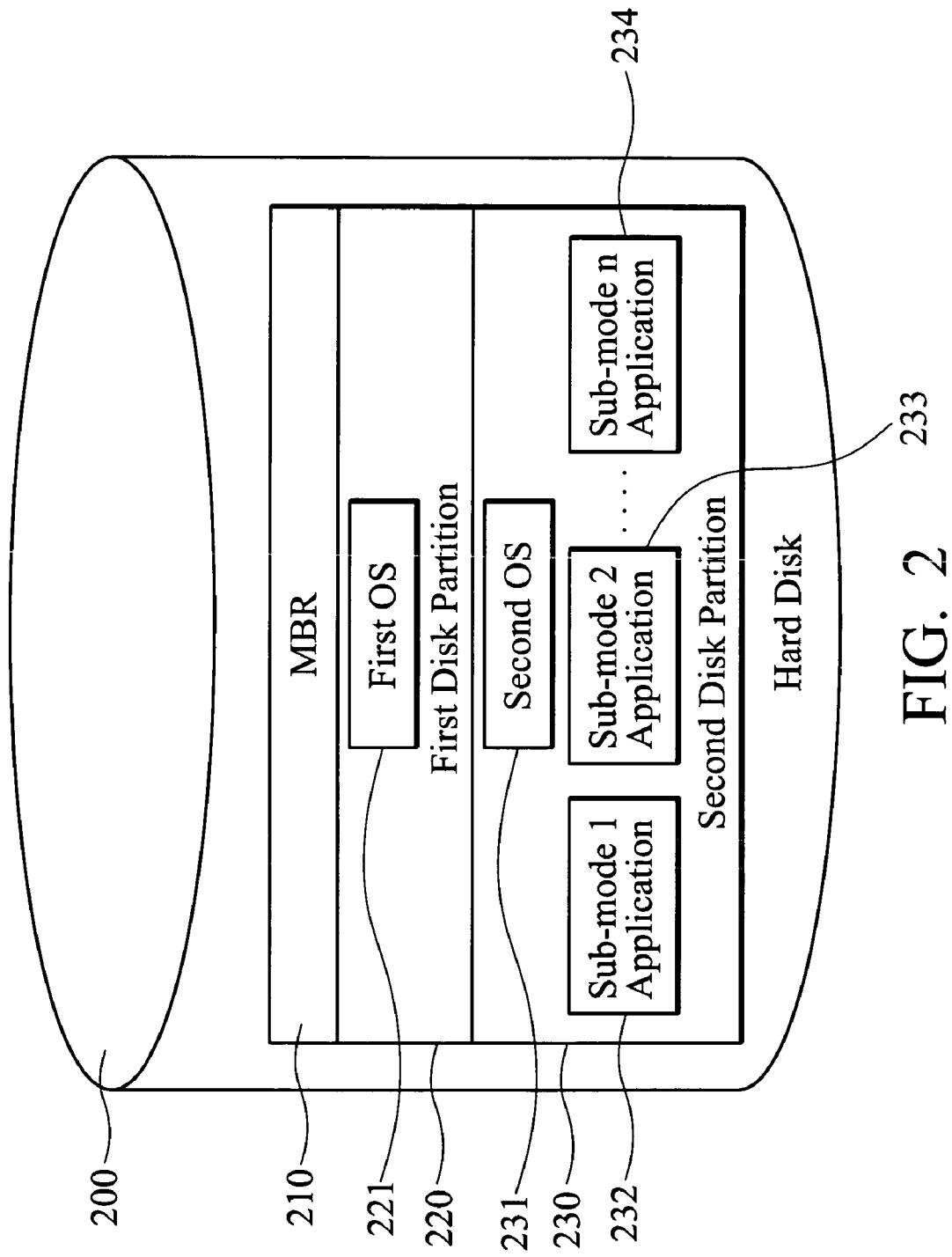
FIG. 2 is a schematic diagram illustrating the structure of a hard disk of the computer system according to the embodiment of the present invention.

FIG. 2 illustrates the configuration of the hard disk 200 (the hard disk 102 in FIG. 1) of the computer system 100 according to the embodiment of the present invention. The hard disk 200 includes a MBR (Master Boot Record) 210, a first disk partition 220, and a second disk partition 230. The MBR 210 is the first sector of the first cylinder in the hard disk 200. The MBR 210 stores a master partition table recording the start address and end address of each partition, and a master boot program. When the computer system 100 is powered up, the master boot program can search the boot sector of the boot partition in the master partition table, and boot the computer system 100.

The first disk partition 220 is a default bootable partition, which enables the computer system 100 to run in the PC mode. The PC mode mentioned throughout the invention indicates a normal operation mode of the computer system, in which all of the software applications, hardware drivers and necessary user interfaces are loaded into the memory and present under the circumstances of operation system for achieving desired functions in response to the instructions from user. The first disk partition 220 includes a first operating system (OS) 221, for example, Windows XP operating system developed by Microsoft Corporation, which is a complete version of operating system. The second disk partition 230 enables the computer system 100 to run in accordance with a selected sub-mode being defined as an entry of a multimedia operation mode class, and includes a second OS 231 and a plurality sub-mode applications 232~234 respectively specific to a corresponding sub-mode, in which the number of the sub-mode applications is the same with the number of the sub-modes, and each sub-mode has a corresponding sub-mode application. In this embodiment, the second OS is a refined version of the operating system in which the operating environment of the computer system is purified, by allowing the user the accessibility of the specific sub-mode application, related hardware driver and necessary user interface to accomplish desired multimedia task, while forbidding the user contacting the software applications, hardware drivers and user interfaces that are irrelevant to the desired multimedia task. Moreover, the sub-modes defined in the multimedia operation mode class include a music playing mode, a DVD/VCD (video) playing mode, a TV broadcasting mode, a radio (AM/FM) receiving mode, and a photo exploring mode.

Figure 3:
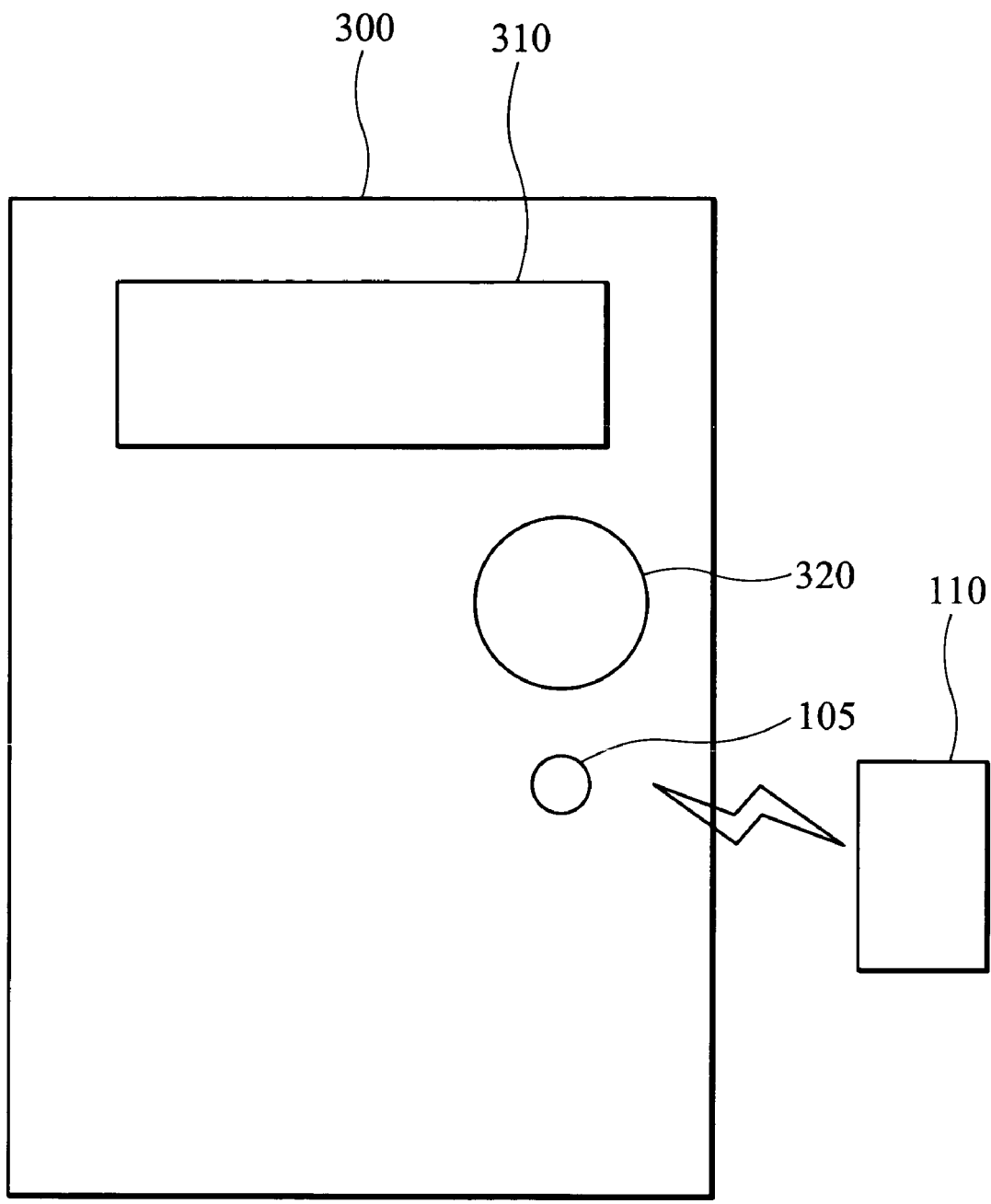
FIG. 3 is an example showing the mode controller and LCD module.

The mode controller 103 indicates the current mode of the computer system. In the embodiment, the mode controller 103 is a manual control, as shown by the mode control 320 in FIG. 3. The mode control 320 can be constructed on the computer host 300, as a knob controller, and the mode control 320 can be manipulated to switch between the PC mode and the sub-modes. Further, an LCD module 310 can be constructed on the computer host 300 to display the operation mode of the computer system.

It should be noted that the LCD module 310 and the mode control 320 can be managed and monitored by an additional microprocessor (not shown in FIG. 3), with the computer system 100 being communicated with the additional microprocessor via an input/output interface to detect the status of the mode control 320 and command the additional microprocessor to display related information on the LCD module 310, in which the input/output interface may be a serial communication port (COM port) or a GPIO (General Purpose Input/Output) interface.

The memory 104 stores related operation data needed by the computer system 100. A receiver 105 can also be constructed on the computer host 300 to receive signals from a remote controller 110, by which the receiver 105 may transmit messages to the computer system 100 via a USB (Universal Serial Bus) interface.

In current practice, the computer system may be turned off by entering a hibernation state. In this situation, the computer system compresses the data in the dynamic RAM into an image file and stores it to the hard disk of the computer system. When the computer system boots, the image file can be decompressed and executed in the memory directly. Thus the computer system can quickly restore its operating environment in use before the computer system is turned off. The present invention employs the above feature, with details to be discussed later.

Figure 4:
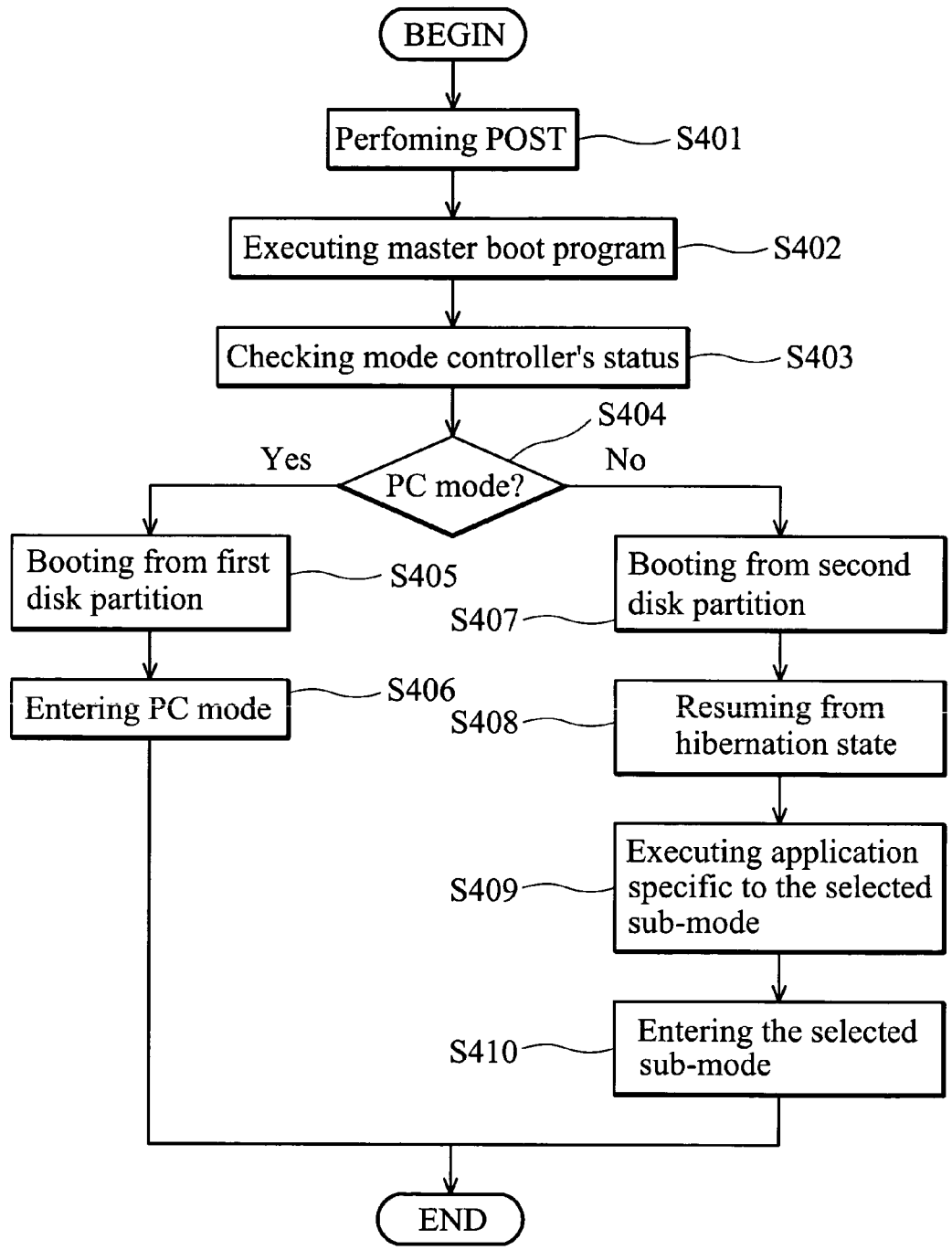
FIG. 4 is a flowchart showing the boot process of the computer system according to the embodiment of the present invention.

FIG. 4 shows the boot process of the computer system 100 according to the embodiment of the present invention. When the computer system 100 boots, in step S401, the BIOS 101 performs POST (Power On self Test) operations, and in steps S402 and S403, executes the master boot program to check the status of the mode controller 103 (mode control 320).

If the status of the mode controller indicates that the operation mode of the computer system is a PC mode (Yes in step S404), in step S405, the computer system 100 boots from the first disk partition 220, and, in step S406, enters the PC mode. If the status of the mode controller indicates that the operation mode of the computer system is a sub-mode defined as an entry of a multimedia operation mode class (No in step S404), in step S407, the computer system 100 boots from the second disk partition 230. Then, in step S408, the computer system 100 resumes from the hibernation state, that is, loads, decompresses, and executes the image file from the memory directly. Thereafter, in step S409, the computer system 100 executes an application specific to the selected sub-mode, and in step S410, enters the selected sub-mode.

Figure 5:
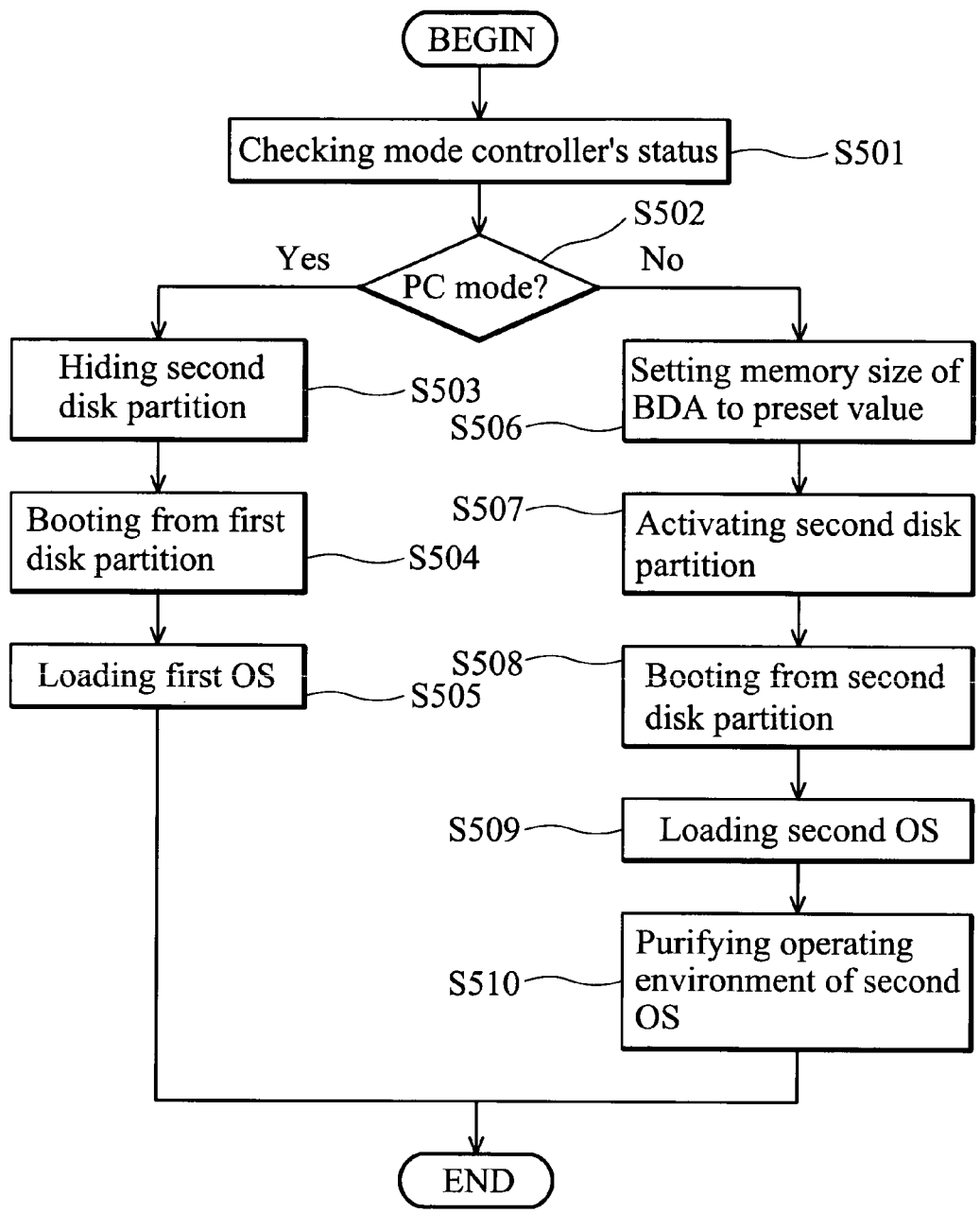
FIG. 5 is a flowchart showing the process of the master boot program according to the embodiment of the present invention.

FIG. 5 shows the process of the master boot program according to the embodiment of the present invention. First, in step S501, the master boot program checks the status of the mode control 320. If the status of the mode controller indicates the PC mode (Yes in step S502), in step S503, the master boot program hides the second disk partition 230, and in step S504, boots the computer system 100 from the first disk partition 220. Thereafter, in step S505, the master boot program loads the first operating system 221 stored in the first disk partition 220, thereby enabling the computer system 100 to run in the PC mode.

If the status of the mode controller indicates a sub-mode (No in step S502), in step S506, the master boot program sets the memory size of the data area in the BIOS (BIOS Data Area, BDA) to a predetermined value, such as 128MB. It should be noted that because the operating system will prompt users to delete related data and reboot the computer system if the memory size detected by the operating system is different from that of the image file recorded in the hibernation state, the purpose of the step S506 is to restrict and maintain the memory size equal to the size of the image file.

Thereafter, in step S507, the master boot program activates the second disk partition 230, and in step S508, boots the computer system 100 from the second disk partition 230. Afterward, in step S509, the master boot program loads the second operating system 231 in the second disk partition 230, thereby enabling the computer system 100 to run in the selected sub-mode. Further, in step S510, the master boot program purifies the operating environment of the operating system, for example, to limit keyboard and mouse functions and disable Plug-and-Play capability, so as to maintain a simple and stable operating environment. It should be noted that the operation of step S510 will be performed only if the computer system 100 entered the sub-mode for the first time, however, if the computer system 100 has ever entered the sub-mode, the execution of step S510 can be skipped because the related limitation has been recorded into the image file in the hibernation state.

When the computer system 100 enters the multimedia mode, a monitor program is executed in the background and communicates with the additional microprocessor, in order to detect the status of the mode control 320 and the LCD module 310 via the input/output interface. The monitor program can instruct the additional microprocessor to display information, such as operation mode information on the LCD module 310.

Figure 6:
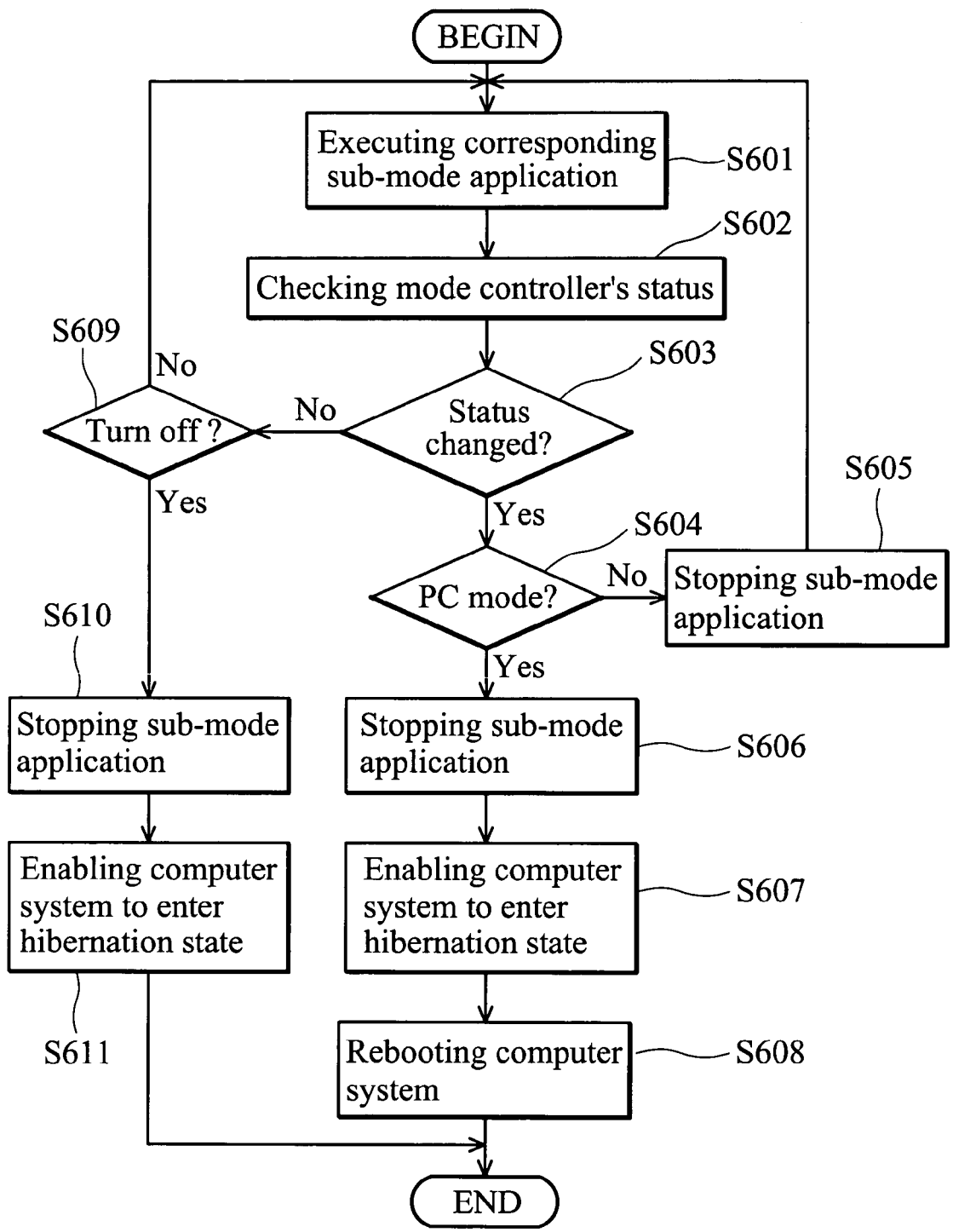
FIG. 6 is a flowchart showing the process of the monitor program while the computer system is running in a sub-mode being defined as an entry in a multimedia operation mode class according to the embodiment of the present invention.

FIG. 6 shows the process of the monitor program while the computer system is running in the selected sub-mode according to the embodiment of the present invention. First, in step S601, the monitor program executes a sub-mode application specific to the selected sub-mode. Then, in step S602, the monitor program checks the status of the mode controller via the input/output interface.

If the status of the mode controller changes to another sub-mode o (Yes in step S603 and No in step S604), in step S605, the monitor program stops the current sub-mode application, and the flow returns to step S601, wherein the monitor program executes another sub-mode application specific to the currently selected sub-mode. If the status of the mode controller changes to the PC mode (Yes in step S603 and Yes in step S604), in step S606, the monitor program stops the current sub-mode application, and in step S607, enables the computer system 100 to perform related hibernation operations and enter the hibernation state. Afterward, in step S608, the monitor program reboots the computer system 100.

If the computer system is turned off (No in step S603 and Yes in step S609), in step S610, the monitor program stops the current sub-mode application, and in step S611, enables the computer system 100 to perform related hibernation operations and enter the hibernation state.

In addition, the monitor program can communicate with the receiver 105 via the USB interface to receive signals from the remote controller 110. When the computer system is operating in a selected sub-mode, a remote controller 110 can be used to instruct the computer system to execute the sub-mode application specific to the selected sub-mode and perform desired functions. After receiving the signal from the remote controller 110, the monitor program translates the signal into a corresponding function key or hot key signal being recognized or supported by the sub-mode application, and sends the key signal to the sub-mode application for further operation. At the same time, the monitor program may transmit a command corresponding to the signal to the additional microprocessor to update the content displayed in the LCD module 310.

In the PC mode, a resident program is executed in the background to detect the status of the mode control 320 or the mode controller 103.

Figure 7:
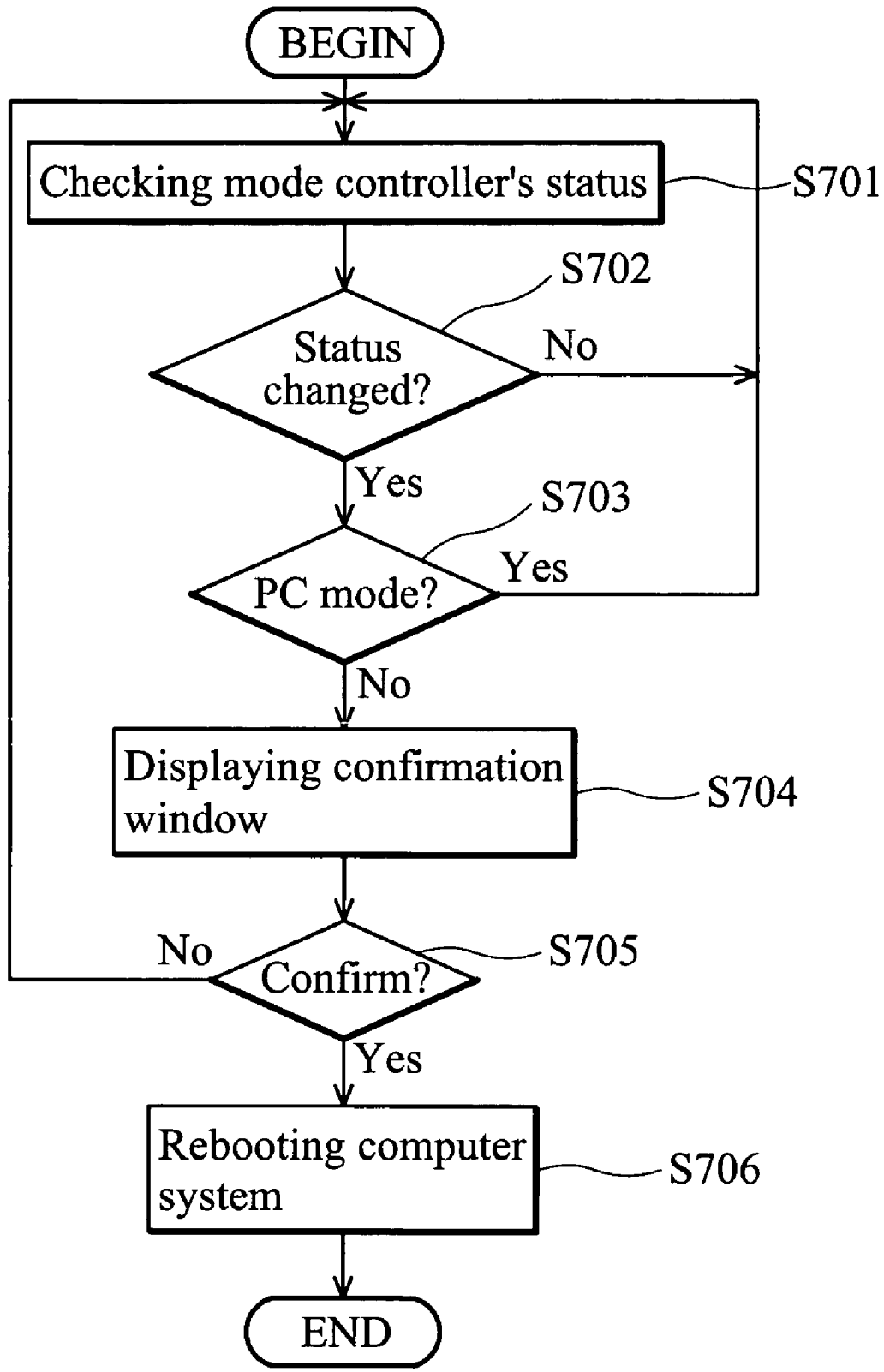
FIG. 7 is a flowchart showing the process of the resident program while the computer system is running in the PC mode according to the embodiment of the present invention.

FIG. 7 shows the process of the resident program in the PC mode according to the embodiment of the present invention. First, in step S701, the resident program checks the status of the mode control 320. If the status has not been changed (No in step S702), or has been changed but remains in the PC mode, the flow returns to step S701. If the status has been changed to a selected sub-mode (No in step S703), in step S704, the resident program displays a confirmation window and waits for confirmation. If a confirmation signal is received through the confirmation window (Yes in step S705), in step S706, the resident program reboots the computer system 100. Otherwise, the flow returns to step S701.

As a result, by using the techniques disclosed herein according to the present invention, the computer system can be easily operated in multiple operation modes according to the manipulation of the mode controller being connected to the computer system. Thus, the computer system may save the time of loading peripheral applications and drivers, and perform initial settings when it is operating as a standalone electronic multimedia device.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A computer system provided to operate in multiple operation modes, comprising:
    a storage device having a first disk partition and a second disk partition, in which the first disk partition stores a first operating system to enable the computer system to boot and run in a first operation mode, and the second disk partition stores a second operating system to enable the computer system to boot and run in a sub-mode of a second operation mode; and
    a mode controller having a status indicating an operation mode of the computer system,
    wherein the storage device further comprises a master boot program to detect the status of the mode controller, hide the second disk partition, boot the computer system from the first disk partition, load the first operating system therein, and thereby enable the computer system to run in the first operation mode if the status of the mode controller indicates the first operation mode, and activate the second disk partition, boot the computer system from the second disk partition, load the second operating system therein, and thereby enable the computer system to run in a selected sub-mode of the second operation mode if the status of the mode controller indicates the selected sub-mode of the second operation mode, and
    a monitor program to be executed if the computer system runs in the selected sub-mode of the second operation mode, in which the monitor program executes a first application specific to the selected sub-mode of the second operation mode, detects the status of the mode controller, and stops the first application and executes a second application specific to another sub-mode of the second operation mode if the status of the mode controller changes to the another sub-mode of the second operation mode.

2. The computer system as claimed in claim 1 wherein the master boot program further sets the memory size of a BIOS data area in the storage device to a predetermined value if the computer system runs in the selected sub-mode of the second operation mode.

3. The computer system as claimed in claim 2 wherein the master boot program further purifies an operating environment of the second operating system if the computer system runs in the selected sub-mode of the second operation mode.

4. The computer system as claimed in claim 3 wherein the master boot program purifies the operating environment of the second operating system by limiting the use of keyboard and mouse of the computer system, and disabling PNP (Plug and Play) functions of the computer system.

5. The computer system as claimed in claim 1 wherein if the status of the mode controller changes to the first operation mode, the monitor program further stops the first application, enables the computer system to enter a hibernation state, and reboots the computer system, and wherein if the computer system is turned off, the monitor program further stops the first application and enables the computer system to enter a hibernation state.

6. The computer system as claimed in claim 1 further comprising an additional microprocessor to detect the status of the mode controller, and the monitor program detects the status of the mode controller via the additional microprocessor and an input/output interface.

7. The computer system as claimed in claim 6 wherein the input/output interface is a serial communication port or a GPIO (General Purpose Input Output) interface.

8. The computer system as claimed in claim 6 further comprising an LCD module being controlled by the microprocessor to display the operation mode of the computer system.

9. The computer system as claimed in claim 6 further comprising a receiver coupled with the monitor program via an input/output interface to receive a signal from a remote controller, so as to enable the monitor program to execute the first application according to the signal.

10. The computer system as claimed in claim 1 wherein the computer system further executes a resident program if the computer system runs in the first operating mode, in which the resident program detects the status of the mode controller, displays a confirmation window if the status of the mode controller changes to a sub-mode of the second operating mode, and reboots the computer system if a confirmation signal is received via the confirmation window.

11. The computer system as claimed in claim 1 wherein the sub modes of the second operation mode include music playing mode, a video playing mode, a TV broadcasting mode, a radio receiving mode, and a photo exploring mode.

12. The computer system as claimed in claim 11 wherein the mode controller is constructed as a manual control on the computer system.

13. A method for operating a computer system in multiple modes, comprising the steps of:
    providing a storage device having a first disk partition and a second disk partition in the computer system, in which the first disk partition stores a first operating system and the second disk partition stores a second operating system;
    providing a mode controller having at least one status indicating an operation mode of the computer system;
    checking the status of the mode controller by a master boot program;
    if the status of the mode controller indicates that the operation mode of the computer system is a first operation mode, hiding the second disk partition, booting the computer system from the first disk partition, loading the first operating system therein, thereby enabling the computer system to run in the first operation mode;
    if the status of the mode controller indicates that the operation mode of the computer system is a sub-mode of a second operation mode, activating the second disk partition, booting the computer system from the second disk partition, loading the second operating system therein, thereby enabling the computer system to run in the sub-mode of the second operation; and
    if the computer system runs in the sub-mode of the second operation mode, executing a monitor program, in which the monitor program executes a first application specific to the sub-mode of the second operation mode, detects the status of the mode controller, and stops the first application and executes a second application specific to another sub-mode of the second operation mode if the status of the mode controller changes to the another sub-mode of the second operation mode.

14. The method as claimed in claim 13 further comprising setting the memory size of a BIOS data area in the computer system to a predetermined value by the master boot program if the computer system runs in the sub-mode of the second operation mode.

15. The method as claimed in claim 14 further comprising purifying an operating environment of the second operating system by the master boot program if the computer system runs in the sub-mode of the second operation mode.

16. The method as claimed in claim 15 wherein the step of purifying the operating environment of the second operating system comprises limiting the use of keyboard and mouse of the computer system, and disabling PNP (Plug and Play) functions of the computer system.

17. The method as claimed in claim 13 wherein if the status of the mode controller changes to the first operation mode, the monitor program further stops the first application, enables the computer system to enter a hibernation state, and reboots the computer system.

18. The method as claimed in claim 17 wherein if the computer system is turned off, the monitor program further stops the first application and enables the computer system to enter a hibernation state.

19. The method as claimed in claim 17 further comprising providing an additional microprocessor to detect the status of the mode controller, the monitor program detects the status of the mode controller via the additional microprocessor and an input/output interface.

20. The method as claimed in claim 19 further comprising providing an LCD module being controlled by the microprocessor to display the operation mode of the computer system.

21. The method as claimed in claim 19 further comprising providing a receiver coupled to the monitor program via an input/output interface to receive a signal from a remote controller, and the monitor program operates the first application according to the signal.

22. The method as claimed in claim 13 further comprising executing a resident program if the computer system runs in the first operation mode, in which the resident program detects the status of the mode controller, displays a confirmation window if the status changes to a sub-mode of the second mode, and reboots the computer system if a confirmation signal is received via the confirmation window.

23. The method as claimed in claim 13 wherein the sub-modes of the second operation mode include a music playing mode, a video playing mode, a TV broadcasting mode, a radio receiving mode, and a photo exploring mode.

24. The method as claimed in claim 22 wherein the mode controller is constructed as a manual control on the computer system.

* * * * *